United States Patent [19]

Chadwick et al.

[11] 4,408,322
[45] Oct. 4, 1983

[54] METHOD AND APPARATUS FOR MEASURING SIGNAL TO NOISE RATIO IN A TDMA COMMUNICATIONS SYSTEM

[75] Inventors: Henry D. Chadwick, Reston, Va.; David W. Matthews, Mt. Airy, Md.

[73] Assignee: Satellite Business Systems, McLean, Va.

[21] Appl. No.: 204,981

[22] Filed: Nov. 7, 1980

[51] Int. Cl.³ .............................. H04J 1/16; H04J 3/06
[52] U.S. Cl. ........................................ 370/17; 370/104
[58] Field of Search ........................... 370/17, 15, 104; 455/226

[56] References Cited

U.S. PATENT DOCUMENTS 4,032,716  6/1977  Allen ..................................... 370/17
4,252,999  2/1981  Acampora et al. .................. 370/104

Primary Examiner—Thomas A. Robinson
Attorney, Agent, or Firm—Pollock, Vande Sande & Priddy

[57] ABSTRACT

A method and apparatus for measuring signal to noise ratio in a time division multiple access (TDMA) communications system which does not require that normal communications be interrupted. The signal to noise ratio measurement is performed on the unmodulated carrier which typically occurs in the preamble of each information burst in the TDMA format. In order to perform the measurements on the carrier of the same burst in each frame, the carrier and noise powers are sampled at a predetermined time with respect to specified information which occurs at the same time in each frame, normally the frame reference burst. After being converted to the receiver intermediate frequency, the unmodulated carrier is fed to both a narrow band pass filter having a pass band at the intermediate frequency and a narrow band stop filter having a stop band at the intermediate frequency. The ratio of the band pass filter output to the band stop filter output is the signal to noise ratio within a very small error.

14 Claims, 3 Drawing Figures

U.S. Patent	Oct. 4, 1983	4,408,322
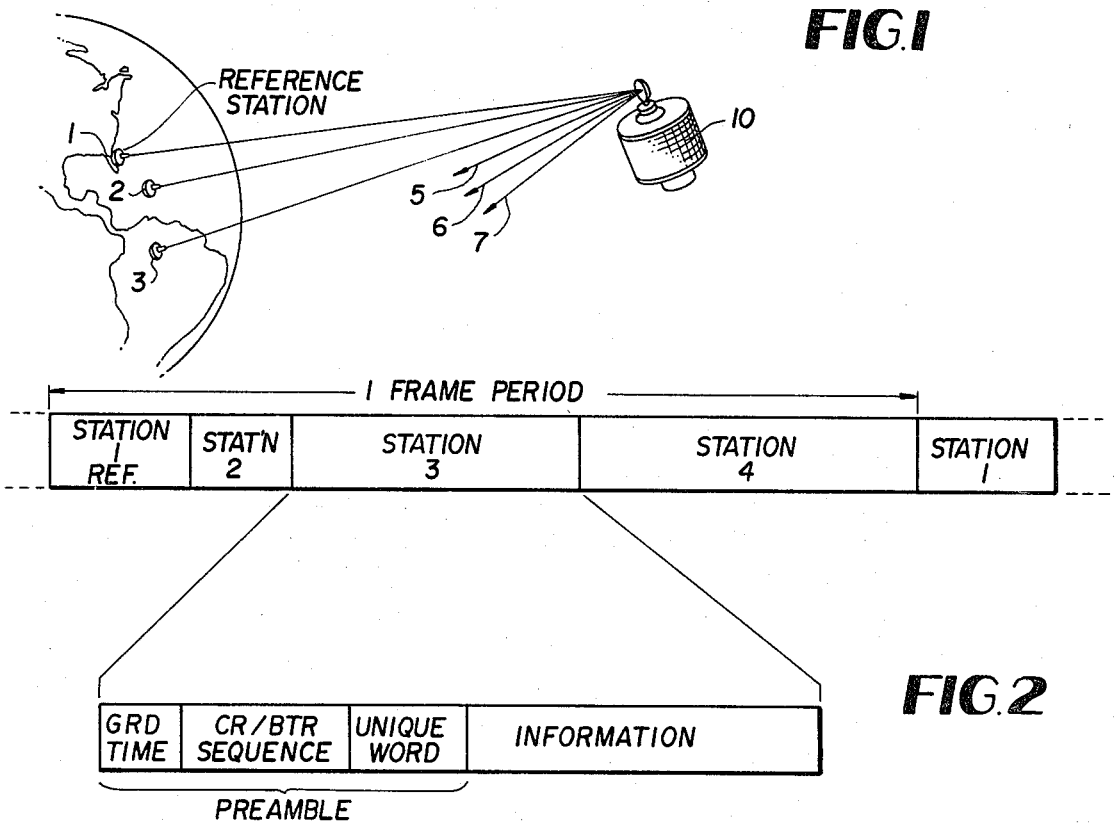
FIG.1
FIG.2
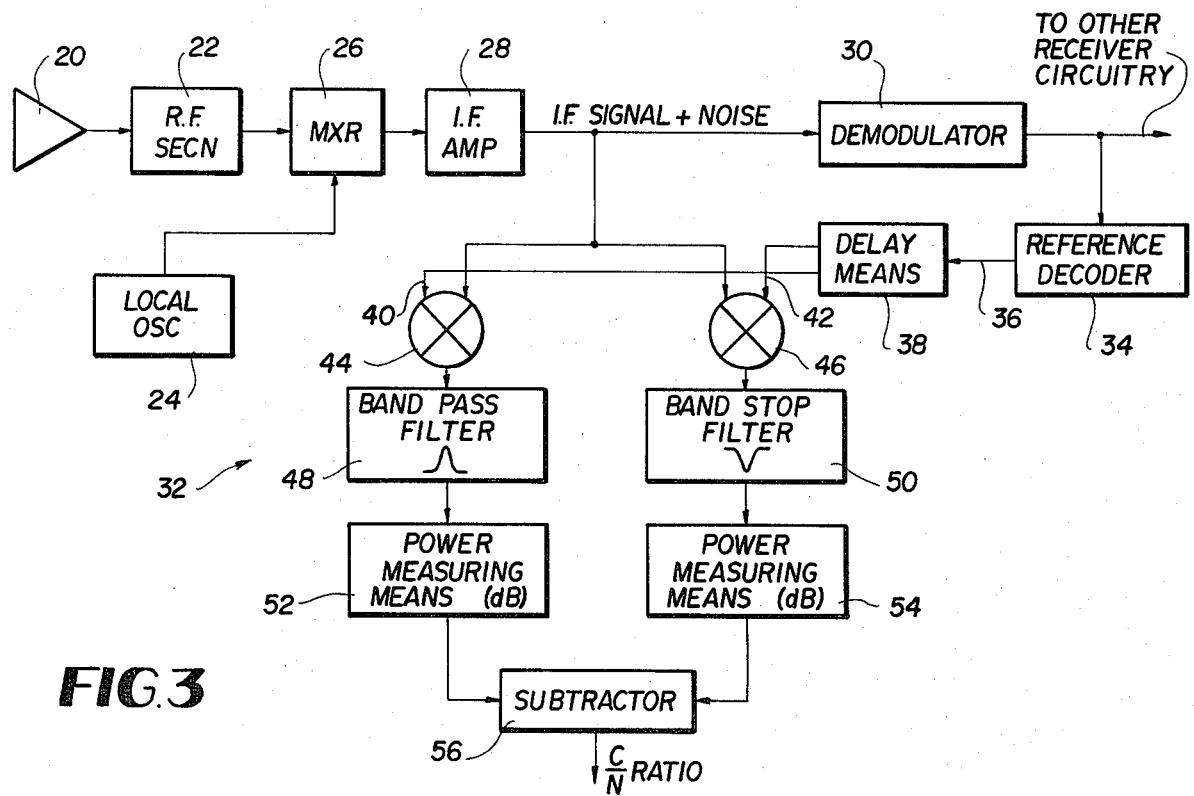
FIG.3

METHOD AND APPARATUS FOR MEASURING SIGNAL TO NOISE RATIO IN A TDMA COMMUNICATIONS SYSTEM

FIELD OF THE INVENTION

The present invention is directed to an improved method and apparatus for measuring signal to noise ratio in a time division multiple access (TDMA) communications system, and particularly to a method and apparatus which does not require that normal communications be interrupted to perform the measurement.

BACKGROUND OF THE INVENTION

In recent years TDMA communications systems have become increasingly important, and they are expected to become even more significant in the future as they find greater use in planned satellite communications systems. In a TDMA system, multiple transmission sources at different locations communicate with a common receiver by emitting serially disposed non-overlapping information signal bursts. Time is divided into frames, and each frame typically includes a reference burst followed by the serial information bursts from the various transmitter sources. The most important application of TDMA to date is in satellite communications wherein a plurality of ground stations access a single transponder on the satellite. It has been found that TDMA possesses greater channel capacity and other advantages as compared to frequency division multiple access (FDMA).

It is recognized that an important figure of merit of any digital communications system is bit error rate, which is the ratio of the number of incorrect bits received over the link to the total number of bits received. A similar figure of merit for a continuous wave communications system is the signal to noise ratio, and signal to noise ratio, if measured in a digital system, may serve as a measure of the system bit error rate.

A known technique of measuring signal to noise ratio in a TDMA system is to transmit a known continuous wave test signal at the carrier frequency over a system which has been shut down for testing, and to separate the signal and the noise power at the receiver with appropriate filtering. A major problem with this approach is that it cannot be used for testing while normal communications are occurring, since when the continuous test signal is transmitted no traffic can be carried.

BRIEF SUMMARY OF THE INVENTION

It is therefore an object of the present invention to provide a method and apparatus for measuring the signal to noise ratio of a TDMA communication system without interrupting normal communications.

It is a further object of the invention to provide such a method and apparatus wherein the signal power and noise power measurements are effected while both signal and noise are present.

It is still a further object of the invention to provide a technique for measuring signal to noise ratio in a TDMA communications system which is easy to implement and requires only a minimum of inexpensive equipment.

It is still a further object of the invention to provide a method and apparatus for measuring signal to noise ratio in a TDMA satellite communications system.

The above objects are accomplished in accordance with the present invention by performing the signal to noise ratio measurement on the unmodulated carrier wave which typically occurs in the preamble of each information burst in the TDMA format. The unmodulated carrier is provided to serve as a carrier reference for the receiver demodulator which demodulates the information which is transmitted in each burst.

In accordance with the invention, the carrier and noise measurements are performed at the receiver on the carrier of the same burst in each frame. This is accomplished by causing the carrier and noise powers to be sampled at a predetermined time with respect to specified information which occurs at the same time in each frame, normally the frame reference burst. After being converted to the receiver intermediate frequency, the unmodulated carrier is fed to both a narrow band pass filter having a pass band at the intermediate frequency and a narrow band stop filter having a stop band at the intermediate frequency. The ratio of the band pass filter output to the band stop filter output is the signal to noise ratio within an error of approximately one percent.

BRIEF DESCRIPTION OF THE DRAWINGS

The invention will be better understood by referring to the accompanying drawings in which:

FIG. 1 is a pictorial illustration of a satellite communications system which may use TDMA.

FIG. 2 is a representation of a typical TDMA frame and a typical burst within the frame.

FIG. 3 is a block diagram of an embodiment of the present invention for measuring signal to noise ratio.

DETAILED DESCRIPTION OF AN EMBODIMENT

Referring to FIG. 1, a satellite communications system which may use TDMA is shown. Satellite 10 is typically a synchronous satellite which rotates in space in synchronism with the rotation of the earth so that it always appears at the same location in space with respect to fixed points on the earth. In the illustration, earth stations 1, 2 and 3 are communicating with a single transponder on satellite 10, which receives the signals and re-transmits them to all ground stations including those which are remotely located from the transmitting stations on the surface of the earth as illustratively depicted at lines 5, 6 and 7. In an actual satellite communications system, many more than six earth stations could be serviced by a single transponder, and each satellite would carry many transponders.

In FIG. 1, the earth stations may communicate with the satellite utilizing time division multiple access. In the TDMA regime, time is divided into frames, and in each frame, the multiplicity of earth stations emit serially occurring, non-overlapping bursts of information. The bursts emitted by the different stations may be of different lengths, and typically, one station emits a reference burst from which the times of the other bursts are measured.

FIG. 2 is an illustration of typical TDMA frame referenced at the satellite and burst formats, and it is seen that a frame period is comprised of serial bursts from stations 1, 2, 3 and 4, in that order. In the illustration, station 1 is the reference station and transmits periodic bursts without closed loop control. The other stations in the network typically use closed loop synchronization through the satellite to place burst transmissions within their assigned time slots. In one operating TDMA satellite system, an earth station is utilized which emits a separate non-traffic bearing reference synchronization burst and subsequently emits a normal traffic burst.

In FIG. 2, a typical burst format is shown below the frame format, and is seen to be comprised of a preamble which is followed by the transmitted information, which, for example may represent voice, video or data. The preamble is typically comprised of a guard time followed by unmodulated carrier and bit timing recovery sequence (CR/BTR) signals which are, in turn, followed by a unique word. The guard time which is typically 100–200 nanoseconds, is provided to ensure that overlap between successive bursts does not occur, while the unmodulated carrier-recovery/bit-timing-recovery signals are used as reference signals for the receiver demodulator. The unique word which follows the unmodulated carrier is used to establish an accurate time reference from which the location of each data bit in the burst can be measured.

A variety of digital encoding and modulation techniques may be utilized in TDMA systems, and are well-known and form no part of the present invention. In the actual system in which the present invention is to be incorporated, phase shift keying modulation is utilized, and the phase shift keying demodulator in the receiver utilizes the unmodulated carrier transmitted as well as the digital clock for coherent demodulation.

It may be appreciated that any communications channel in the real world has noise which to a greater or lesser extent degrades the information signal which is being transmitted. It is therefore useful to measure the signal to noise ratio, and in a digital communications system this ratio may be used as a measure of bit error rate.

As mentioned above, a prior art technique of measuring signal to noise ratio in a TDMA satellite communications system was to close the channel down and transmit a continuous wave signal, which was appropriately filtered at the receiver to divide out the signal and noise components. However, the problem with this approach is that it can only be implemented when the communications system is down, and it is therefore the most important object of the present invention to provide a technique for measuring signal to noise ratio which can be utilized without interrupting normal communications traffic. Also, because of the non-linear nature of the communications channel involved, it is desirable to provide a system which measures the signal and noise power when both are present.

In accordance with the invention, this is accomplished by utilizing the unmodulated carrier in the preamble of the signal burst for effecting the signal to noise ratio measurement. Since the unmodulated carrier must exist anyway to provide a reference for the demodulator, no additional signal need be generated, and the measurement can be performed while the communications system is handling traffic in its normal mode of operation.

FIG. 3 is a block diagram of an embodiment of the apparatus of the invention and includes several of the functional blocks of the receiver as well as the signal to noise measuring circuitry which is added thereto. Referring to the figure, the signal bursts are incident on antenna 20, which feeds them to the front end of the receiver which includes RF section 22, local oscillator 24, mixer 26, and I.F. amplifier 28. RF section 22 includes appropriate filtering and amplification means as well as other circuitry not relevant to the explanation of the present invention. The receiver is tuned to the incoming carrier frequency by local oscillator 24, and the upcoming signal is reduced to the intermediate frequency by being fed through mixer 26. The signal at the output of I.F. amplifier 28 consists of the signal at the intermediate frequency and noise, and the composite signal consisting of these two components is fed to demodulator 30 as well as to signal to noise ratio measuring circuitry 32. The noise at the intermediate frequency is band-limited within a certain frequency range of the carrier frequency by the receiver band pass at the intermediate frequency.

It will be recalled that it is desired to measure the signal and noise powers on the same unmodulated carrier in each frame. Accordingly, the output of demodulator 30 is fed to reference decoder 34 or other means which is arranged to recognize the unique information in the reference burst and to emit an output signal responsive thereto. This output signal on line 36 is delayed by delay means 38 for a predetermined period of time equal to the time between the occurrence of the reference burst and the occurrence of the unmodulated carrier in the preamble of the burst which it is desired to use for the signal to noise ratio measurement and at the end of the delay time, the delay means 38 feeds a signal out on lines 40 and 42.

The output of I.F. amplifier 28 is fed to one input of each of gates 44 and 46, and the output of delay means 38 on lines 40 and 42 is fed to the other input of each of the gates. Gates 44 and 46 are of the type, well known in the art, which gate a signal at one input through, when a particular logic state is present at the other input. Thus, the intermediate frequency signal and accompanying noise is passed through the gates only when the designated unmodulated carrier on which it is desired to perform the signal to noise is present.

The output of gate 44 is fed to narrow band pass filter 48 which has a pass band at the intermediate frequency while the output of gate 46 is fed to narrow band stop filter 50 which has a stop band at the intermediate frequency.

Thus, the output of band pass filter 48 is approximately the signal power while the output of band stop filter 50 is approximately the noise power. The signal and noise powers respectively are fed to power measuring means 52 and 54 which measure power in decibels, and the outputs thereof are fed to subtractor 56 which provides an indication of the signal to noise ratio.

The narrow band pass filter must be selected to have sufficient bandwidth to permit its output to reach its final level before the sampling time. Using the rule that the rise time of the filter output is given by 0.7/BW a bandwidth of 700 KHz would provide a rise time of one microsecond. Since the unmodulated carrier signal is approximately 2.6 microseconds in length, such a bandwidth is sufficient.

The signal to noise ratio measuring technique of the invention produces an error which is caused by noise at the carrier frequency passing through the narrow band pass filter, but since the noise is assumed to be evenly distributed over the band, such error is negligible. Thus, where the error is z, $Z=(B_2/B_1)/(C/N)$ where $B_2$ is the narrow band filter bandwidth and $B_1$ is the noise power bandwidth. If $B_2=700$ KHz and $B_1=25$ MHz, then for signal to noise ratio C/N of 8dB, $z=4.4\times10^{-3}$, which is less than one percent.

Thus, there has been described a method and apparatus for measuring signal to noise ratio in a time division multiple access communications system which may be employed when the system is handling normal communications traffic, and which provides accurate results. While described in connection with a satellite communications system, it is to be understood that the invention is not so limited. Also, it is to be understood that means other than that illustrated may be used to provide sampling at the correct time in each frame.

Further it should be understood that while we have described certain embodiments of the present invention, we do not intend to be restricted thereto, but rather intend to cover all variations and modifications which come within the spirit of the invention, which is limited only by the claims which are appended hereto.

What I claim is:

1. A method of measuring signal to noise ratio in a time division multiple access communications system in which a plurality of transmission sources communicate with a receiver, without interrupting normal communications, said communications system being of the type in which time is divided into frames which are comprised of a plurality of sequential bursts from different transmission sources and wherein the preamble of each burst includes an unmodulated carrier signal which is used as a reference signal for the demodulator at the receiver, comprising the steps of, measuring the amplitude of said unmodulated carrier signal of a said burst or a quantity indicative of said carrier amplitude, at said receiver, measuring the amplitude of noise which accompanies said unmodulated carrier signal within a certain frequency range of the carrier frequency at said receiver or a quantity indicative of said noise amplitude, and providing an indication of the ratio of said signal amplitude to said noise amplitude.

2. The method of claim 1, wherein said receiver is a superheterodyne receiver which converts received signals to an intermediate frequency, and wherein said unmodulated carrier signal and noise are measured at said intermediate frequency and said certain frequency range over which said noise is measured is determined by the characteristics of said superheterodyne receiver.

3. The method of claim 2, wherein said signal amplitude and noise amplitude measurements are made repetitively in successive frames on the same unmodulated carrier signal in each frame.

4. The method of claim 3, wherein specified information occurs at the same time in each frame, and wherein said signal amplitude and noise amplitude measurements are made in each frame at a predetermined time with respect to the occurrence of said specified information.

5. The method of claim 4, wherein said specified information is a reference burst.

6. The method of claim 5, wherein measuring said carrier and noise signals includes, passing said carrier signal and noise at said intermediate frequency through a narrow band pass filter having a pass band at the carrier frequency, and also passing said carrier signal and noise at said intermediate frequency through a narrow band stop filter having a stop band at the carrier frequency.

7. The method of claims 1 or 6, wherein said steps of measuring said signal and noise amplitudes or quantities indicative thereof comprises respectively, measuring the carrier power, and measuring the noise power.

8. An apparatus for measuring signal to noise ratio in a time division multiple access communications system in which a plurality of transmission sources communicate with a receiver, without interrupting normal communications, said communications system being of the type in which time is divided into frames which are comprised of a plurality of sequential bursts from different transmission sources, and wherein the preamble of each burst includes an unmodulated carrier signal which is used as a reference signal for the demodulator at the receiver, comprising, means for measuring the amplitude of said unmodulated carrier signal of a said burst or a quantity indicative of said carrier amplitude, at said receiver, means for measuring the amplitude of the noise which accompanies said unmodulated carrier signal within a certain frequency range of the carrier frequency, at said receiver, or a quantity indicative of said noise amplitude; and means for providing an indication of the ratio of said signal amplitude to said noise amplitude.

9. The apparatus of claim 8, wherein said receiver is a superheterodyne receiver and includes means for converting received signals to an intermediate frequency, said means for measuring said carrier signal and said means for measuring said noise signal being connected to the output of said converting means for measuring said carrier and noise signals at said intermediate frequency.

10. The apparatus of claim 9 comprising means for making said signal amplitude and noise amplitude measurements repetitively in successive frames on the same unmodulated carrier signal in each frame.

11. The apparatus of claim 10, wherein specified information occurs at the same time in each frame, and wherein said means for making said signal amplitude and noise amplitude measurements repetitively comprises means for making said measurements in each frame at a predetermined time with respect to the occurrence of said specified information.

12. The apparatus of claim 11, wherein said specified information is a reference burst.

13. The apparatus of claim 12, wherein said means for measuring said carrier signal includes means for passing said carrier signal and noise at said intermediate frequency through a narrow band pass filter means having a band pass at the carrier frequency, and wherein said means for measuring said noise signal includes means for passing said carrier signal and noise through a narrow band stop filter means having a stop band at the carrier frequency.

14. The apparatus of claim 8 or 13, wherein said means for measuring the amplitude of said unmodulated carrier signal or a signal indicative thereof and said means for measuring the amplitude of the noise accompanying said unmodulated carrier or a signal indicative thereof comprise respectively, means for measuring the carrier power, and means for measuring the noise power.

* * * * *